Aug. 14, 1962 R. A. WHITLOCK 3,049,238
WATER TREATMENT APPARATUS
Filed Dec. 19, 1958 2 Sheets-Sheet 1

Inventor
Robert A. Whitlock
By McCanna, Morsbach & Pillote
Atty's

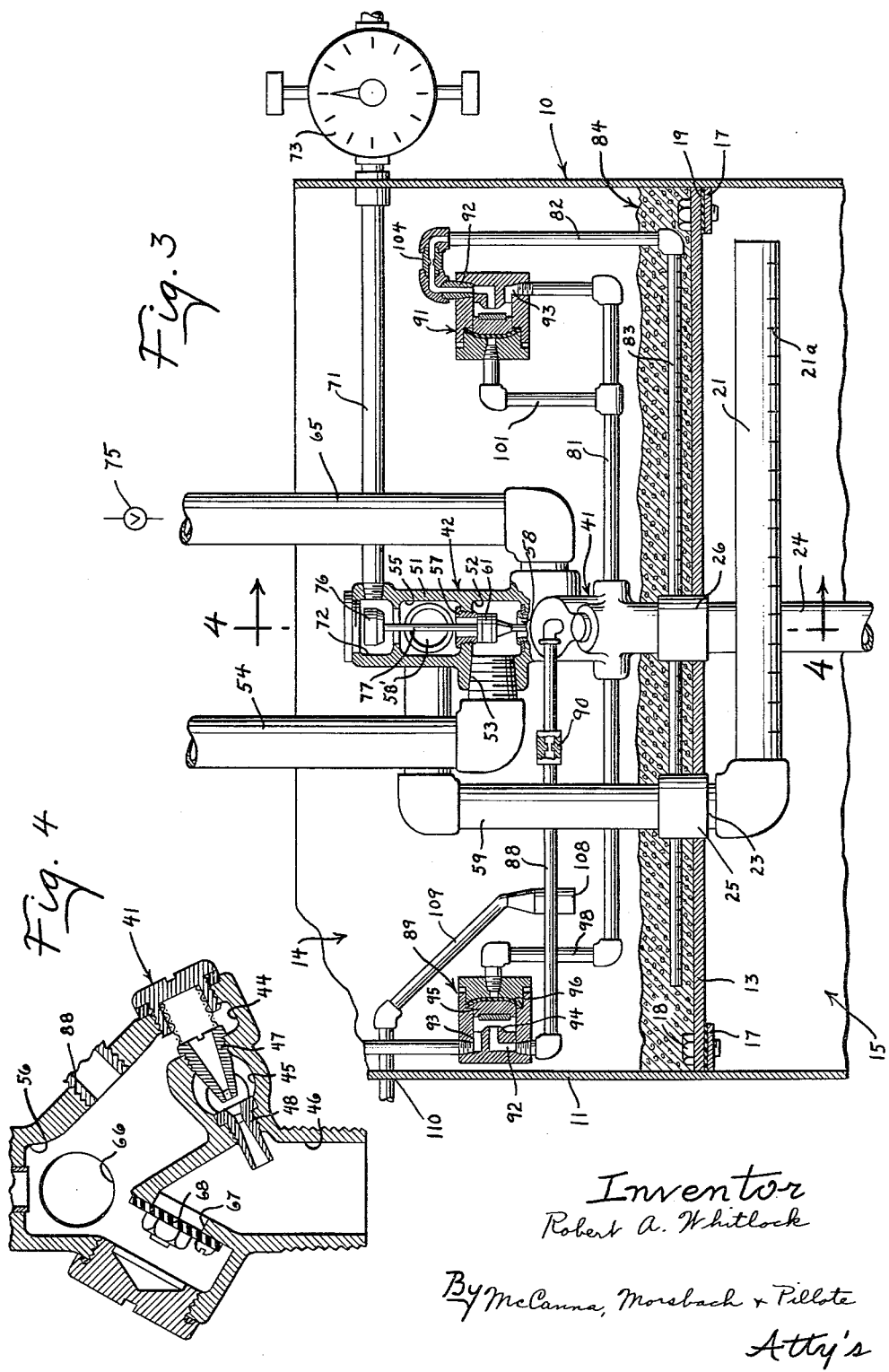

//patents.google.com/patent/US3049238

United States Patent Office 3,049,238
Patented Aug. 14, 1962

3,049,238
WATER TREATMENT APPARATUS
Robert A. Whitlock, Rockford, Ill., assignor to Aqua-Matic Inc., Rockford, Ill., a corporation of Illinois
Filed Dec. 19, 1958, Ser. No. 781,502
9 Claims. (Cl. 210—191)

This invention relates to a water softening apparatus.

Various important objects of this invention are to provide a water treating apparatus which is of compact construction, pleasing in appearance and which can be easily installed and repaired.

Another object of this invention is to provide a self-contained water treatment apparatus having a treatment tank and a regenerant tank and wherein the valves for controlling the flows of water to and from the treatment tank and between the regenerant tank and treatment tank, are located within the regenerant tank.

A more particular object of this invention is to provide a water treatment apparatus of the type having a treatment tank and a regenerant tank adapted to receive a charge of salt at the beginning of the regeneration cycle, and having an improved apparatus for controlling the liquid level in the regenerant tank to provide a relatively high liquid level during a portion of the regeneration cycle sufficient to completely cover the salt in the regenerant tank and which automatically lowers the liquid level in the tank prior to completion of the regeneration cycle, to provide head space therein for the reception of a subsequent charge of salt.

Still another object of this invention is to provide a water treatment apparatus in accordance with the foregoing objects and wherein the regenerant is withdrawn from the regenerant tank and forced through the treatment tank under pressure so as to enable delivery of the effluent from the treatment tank under pressure to a drain line.

These, together with various ancillary objects and advantages of this invention will be more readily appreciated as the same becomes better understood by reference to the following detailed description when taken in connection with the accompanying drawings wherein:

FIG. 3 is a fragmentary sectional view through the upper portion of a water treatment apparatus on a scale larger than FIG. 2 and with the valve broken away and shown in section to illustrate the regeneration position thereof; and FIG. 4 is a fragmentary sectional view through the ejector, taken on the plane 4—4 of FIG. 3.

Figure 1:
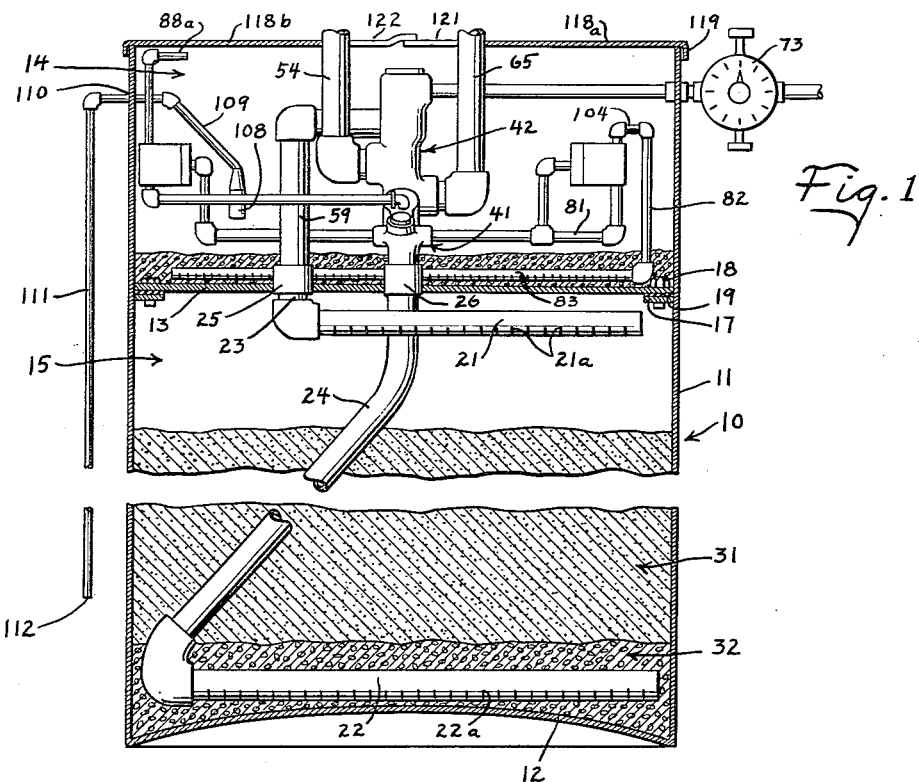
FIGURE 1 is a fragmentary view, shown partly in cross-section and partly in elevation, through the water treatment apparatus of the present invention.

Reference is now made more specifically to FIGURE 1 of the drawings wherein there is illustrated a tank 10 having side walls 11 and a bottom wall 12. The tank is separated by a partition 13 into an upper regenerant compartment 14 and a lower treatment compartment 15. As shown herein, the partition is disposed below the upper edge of the tank and is removably secured to an annular rim 17 carried by the tank, by means of fasteners 18. A gasket 19 is interposed between the partition and the rim to form a seal therebetween. The lower treatment compartment 15 is thus sealed, to permit the passage of fluid therethrough under pressure, and the upper regenerant compartment 14 has the top open to atmosphere to facilitate the introduction of the regenerant thereinto.

Upper and lower distributors 21 and 22 are disposed within the treatment compartment adjacent the top and bottom thereof. Fluid is introduced and withdrawn from the distributors 21 and 22 through conduits which extend from the distributors through the regenerant compartment through the partition 13 and which also support the distributors on the partition for removal therewith. In particular, the upper distributor 21 is connected through a pipe nipple 23 to a coupling 25 which extends through the partition 13 and is sealed thereto as by welding. The lower distributor 22 is connected through a pipe 24 to a coupling 26, which last-mentioned coupling also extends through the partition 13. As is conventional, the upper and lower distributors 21 and 22 have spaced openings 21a and 22a respectively, herein shown in the form of slots cut in the underside of the distributor. A quantity of ion exchange resin 31 is disposed within the treatment tank and is preferably supported on a distributor bed of gravel 32 or the like. As is conventional, the upper level of the bed 31 is spaced below the top of the treatment compartment to provide a head space therein and permit expansion of the bed during backwashing or upflow therethrough.

The water treatment apparatus of the present invention is of the type wherein a quantity of granulated regenerant such as salt is introduced into the regenerant compartment 14 at the beginning of the regeneration cycle and water is thereafter introduced into the regenerant compartment and withdrawn therefrom to dissolve the regenerant and feed the same to the treatment compartment therebelow to regenerate the bed of exchange matter 31. It is a feature of the present invention that the valve mechanism, for controlling the several flows of liquid to and from the regenerant compartment and treatment compartment, is disposed within the regenerant compartment to thereby provide a treatment apparatus which is compact in construction and pleasing in appearance.

The valve mechanism includes an ejector 41 (see FIG. 4) which is operative to draw regenerant from the regenerant compartment and feed the same into the treatment compartment, and a flow reversing valve 42 which is connected to the ejector to control the flow of water thereto. The ejector 41, as is conventional, includes a nozzle 47 and a throat 48. Raw water from the raw water inlet chamber 44 is directed through the nozzle 47 into the throat 48 and draws regenerant into the regenerant inlet chamber 45. The mixture of water and regenerant is passed through the throat to the ejector outlet passage 46. The outlet passage 46 is connected to the coupling 26 leading to the lower distributor so that regenerant from the regenerant compartment 14 is fed to the treatment compartment 15, when the fluid pressure at the ejector inlet chamber 44 is higher than the fluid pressure at the ejector outlet passage 46.

The flow reversing valve 42 is connected to the ejector 41 and to one of the distributors in the treatment compartment and may be of any suitable construction which is operative in one position to pass untreated water to one of the distributors in the treatment compartment and in the other position to pass water to the ejector for flow therethrough to the other distributor in the treatment compartment. As shown herein, the flow reversing valve 42 includes a casing 51 having an inlet chamber 52. An inlet passage 53 is formed in the casing, in communication with the inlet chamber, and is connected to the raw water supply line 54. The casing also includes top and bottom chambers 55 and 56 (see FIG. 4) which communicate with the inlet chamber through passages 57 and 58 respectively. The bottom chamber 56 is in continuous communication with the ejector inlet chamber 44 so that liquid is supplied to the ejector under the control of the flow reversing valve. The top chamber 55 has a top outlet passage 58' therein which communicates through pipes 59 with the top distributor 21. A valve member 61 is disposed within the inlet chamber 52 and, during service, is seated in the position shown in FIG. 2 blocking flow through the passage 58. Raw water from the supply line 54 is then passed from the inlet chamber 52, through passage 57, top chamber 55, outlet passage 58' and pipe 59 to the top distributor 21. The raw water flows downwardly through the bed of exchange materials 31 in the lower treatment chamber and the treated water flows upwardly from the lower distributor 22 through the pipe 24. The service pipe 65 is advantageously arranged to communicate with the bottom chamber 56, through a service outlet passage 66 (see FIG. 4), to permit the flow of untreated water to service during the regeneration of the treatment apparatus. A passage 67, also shown in FIG. 4, is provided for by-passing the ejector 41, when treated water flows from the treatment compartment 15 to the service line 65, and a check valve 68 is provided for controlling flow through the passage 67. The check valve is arranged to open to permit the aforementioned flow to service, and to close to prevent reverse flow from the chamber 56 downwardly through the passage 67.

Figure 2:
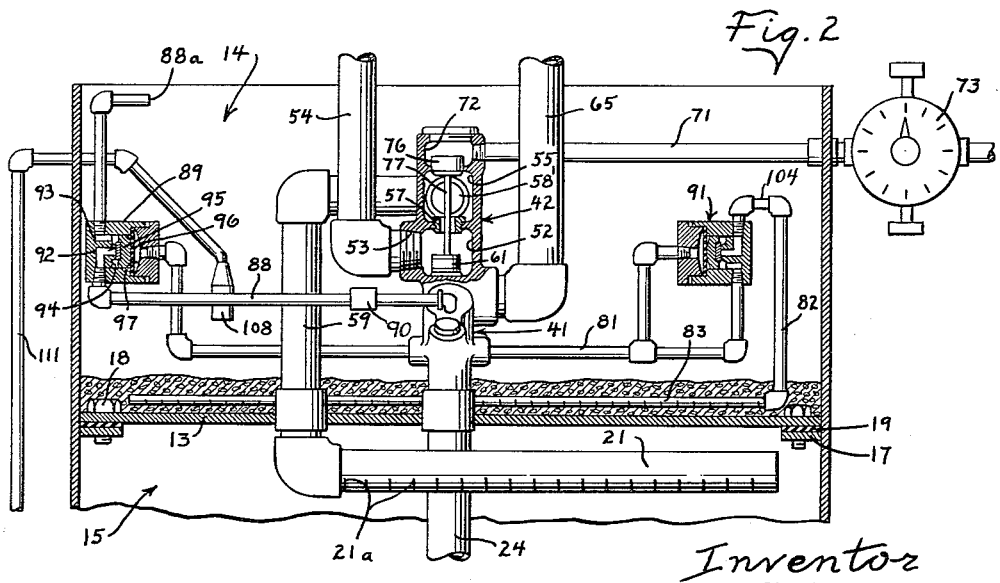
FIG. 2 is a fragmentary sectional view through the upper portion of the water treatment tank on a somewhat larger scale than in FIGURE 1 and with the valve mechanism broken away and shown in section to illustrate the same in the normal service position.

The flow reversing valve 42 is preferably arranged so as to permit actuation thereof by an apparatus disposed externally of the tank 10 and, as shown herein, is arranged to be hydraulically operated from its normal service position shown in FIG. 2 to its regeneration position shown in FIG. 3. For this purpose, a drain conduit 71 is connected to the casing 51 to communicate with an upper drain chamber 72 therein. The drain conduit extends to a point externally of the tank 10 and a timer controlled drain valve 73 is provided in the drain conduit to control flow therethrough.

When the flow reversing valve member 61 is in the position shown in FIG. 2 and the service line valve 75 is closed, the fluid from the inlet chamber 52 passes through the pipe 59, treatment compartment 15 and pipe 24 to the bottom chamber 56 and builds up the pressure in the bottom chamber until it is substantially equal to full inlet pressure. When the drain valve 73 is thereafter opened, at the beginning of the regeneration cycle, the pressure at the top chamber 55 is rapidly reduced, since it is communicated to atmosphere through the drain conduit 71, and this momentarily reduces the pressure in the inlet chamber 52. The pressure in chamber 56 is therefore momentarily higher than the pressure in the inlet chamber 52 and this produces a pressure unbalance on the valve member 61 which urges it towards its raised position shown in FIG. 3. In order to provide more reliable operation, particularly at low pressures, an enlarged head 76 is attached to the valve member 61, by means of a stem 77. The head is disposed in the path of flow of liquid from the upper chamber 55 to drain through the drain conduit 71 so that the liquid impinges on the head 76, as it flows to drain, and aids in lifting the valve member to its raised position. When the valve member reaches its raised position, the flow through the valve is reversed and then passes from the inlet chamber 52 downwardly through passage 58, bottom chamber 56, ejector 41 and conduit 24 to the bottom of the treatment tank, the effluent from the top of the treatment tank flowing through conduit 59 and top chamber 55 to drain. The ejector 41 has a high flow impedance so that the pressure in the bottom chamber 56, during regeneration, is maintained at a relatively high value. The pressure in the inlet chamber 52, during regeneration, therefore remains at substantially full inlet pressure while the top chamber 55 is connected to drain through the drain conduits 71 so that there is a pressure unbalance on the valve member 61 which holds the same in its raised position. During regeneration, the ejector 41 is operative to draw regenerant from the regenerant compartment 14 and pass the same into the treatment compartment 15. For this purpose, the regenerant inlet chamber 45 of the ejector is connected through conduits 81 and 82 to a distributor 83 located adjacent the bottom of the regenerant chamber 14. The distributor 83 may conveniently be in the form of a slotted pipe which is disposed within a distributing bed 84 of gravel or the like.

As previously described, a charge of salt is introduced into the compartment 14 at the beginning of the regeneration cycle, and in order to dissolve the salt during regeneration, provision is made for introducing water into the regeneration compartment simultaneous with the withdrawal of brine therefrom by the ejector 41. For this purpose, a water inlet line 88 is connected to a source of water under pressure, such as the bottom chamber 56 of the flow reversing valve. Preferably, the discharge end 88a of the inlet pipe 88 is located remote from the regenerant distributor 83. Water is thus supplied to the regenerant compartment 14 through pipe 88 and withdrawn therefrom through distributor 83, during regeneration of the bed of exchange material. In order to prevent flow into the regenerant compartment 14, during the normal service run, valves 89 and 91 are provided in the pipes 88 and 81.

The valve 89 is of the pressure operated type and includes an inlet 92, an outlet 93, and a valve seat 94 intermediate the inlet and outlet. A valve member 95 is mounted for movement into and out of engagement with the seat 94 under the control of a pressure responsive diaphragm 96. The chamber 97 (see FIG. 2) at the side of the diaphragm opposite the valve member, is communicated through a pipe 98 with the regenerant inlet chamber 45 of the ejector. During the normal service run, the fluid pressures at the inlet and outlet of the ejector 41 are substantially equalized so that the pressure in the regenerant chamber 45 builds up to substantially the same pressure as exists in the lower chamber 56 of the multiport valve. This fluid pressure is applied to the diaphragm 96 and moves the valve member 95 to its seated position blocking flow through the pipe 88. During regeneration, the pressure at the regenerant inlet chamber 45 is reduced to a relatively low value below atmospheric pressure whereby the pressure in the valve 89 is operative to move the valve member 95 away from its seat and permit liquid to flow through conduit 98 into the regenerant compartment.

The valve 91 in the line 81 may be of any construction which will automatically open during regeneration and permit the flow of regenerant from the regenerant compartment to the ejector 41, and to close to prevent return flow therethrough during service. The valve 91 herein shown is identical in construction to the valve 89, and like numerals are utilized to designate the same parts. The diaphragm chamber 97, of the valve 91, is connected through a pipe 101 to the conduit 81 leading to the ejector. Consequently, during service, fluid under pressure from the ejector is supplied through the conduit 81 to the valve 91 and also to the diaphragm chamber 97 of that valve so that the valve member is urged to its closed position blocking flow into the regenerant compartment. During regeneration, the pressure at the regenerant inlet chamber 45 is reduced to a low value below atmospheric pressure. This moves the valve member 95 to its open position and allows liquid to flow from the regenerant chamber into the ejector 41.

It is desirable to provide a relatively high liquid level in the regenerant compartment during regeneration in order to adequately dissolve all of the salt therein. It is also desirable, however, to have the liquid level in the regenerant compartment relatively low, at the beginning of the regeneration cycle, so as to provide adequate head space to introduce the salt into the regenerant compartment without causing overflow of liquid. In accordance with the present invention, the conduit 88 is arranged, during regeneration, to introduce liquid into the regenerant compartment at a rate somewhat in excess of the rate at which the liquid is withdrawn from the regenerant compartment through the conduits 81 and 82. A flow restrictor 90 is provided in the line 88 to regulate the rate of flow of water into the compartment 14 and a flow restrictor 104 is provided in the conduit 82 to limit the rate of flow or withdrawal of liquid from the regenerant chamber. The flow restrictor 104 is located in the line 82 to restrict the flow of regenerant from the compartment 14 to the valve 91. This assures that the pressure in line 81, during the brine injection phase of the regeneration cycle, will be sufficiently low to reliably open the valve 91.

Since the rate of inflow of raw water to the regenerant compartment exceeds the rate at which the brine is withdrawn therefrom, the liquid level in the regenerant compartment will gradually build up and completely immerse all of the salt therein. A syphon type overflow device is provided in the regenerant compartment, to permit the liquid level therein to build up to a preselected upper level as is required to adequately dissolve the salt, and to then draw off liquid from the regenerant compartment to lower the liquid level therein and provide head space for the introduction of a charge of salt in the subsequent regeneration cycle. This syphon overflow device has an inlet 108 spaced a short distance above the distributor bed 84 and has an upwardly extending portion 109 which extends to a level 110 spaced above the inlet 108 and below the upper edge of the regenerant compartment. The overflow pipe includes a downwardly extending portion 111 which terminates at its lower end 112 located below the bottom of the regenerant compartment 14. As is apparent, the liquid level in the regenerant compartment will rise until it reaches the upper level 110 at which time the liquid will begin to syphon out of the regenerant compartment. The syphon has a restriction in the inlet 108 thereof arranged to control the withdrawal of liquid from the regenerant compartment to a rate somewhat greater than the differential between the rate of inflow to the regenerant compartment through conduit 88 and the rate of outflow therefrom through the distributor 83 so that, when the syphon becomes operative, it reduces the liquid level in the regenerant compartment until the liquid reaches the level of the inlet 108 of the syphon. When the liquid reaches the level of the inlet 108 of the syphon, the syphon will thereafter operate to draw liquid and air alternately. The rate of flow through the syphon is adjusted so that the combined rate of outflow to the treatment compartment 15 and through the overflow only slightly exceeds the rate of inflow to the compartment 14 so that the weight of the water and air in the portion 111 of the syphon exceeds the weight of the water and air in the portion 109 thereof at all times during the regeneration and rinsing phases of the regeneration cycle to assure continued operation of the syphon.

A removable cover is preferably provided for the apparatus, to keep dust and foreign matter out of the regenerant compartment and, as shown in FIG. 1, may conveniently be formed in two half sections 118a and 118b. The sections have a depending flange 119 on the arcuate edge thereof and slots 121 and 122 formed therein to accommodate the raw water inlet and service pipes 54 and 65 respectively.

From the foregoing it is thought that the operation and construction of the device will be readily understood. As will be noted, the valve mechanism for reversibly controlling the flows to and from the regenerant and treatment compartments is disposed wholly within the regenerant compartment and only the drain valve 73 for controlling the operation of the flow reversing valve is located externally of the tank. This provides a compact water treatment apparatus in which the outer casing can have a smooth appearance unencumbered by valves and complex external piping. It is also to be noted that the ejector, flow reversing valve and other control valves together with the inlet and outlet manifolds 21 and 22 are mounted on the partition 13 which separates the tank into the regenerant and treatment compartments, whereby the entire operating mechanism can be inserted and withdrawn from the treatment tank for easy repair or replacement of parts.

During the normal service run, the control valve member 61 is in its lower position shown in FIG. 2 and fluid flows from the inlet 54 into the top distributor 21. The treated water from the bottom of the tank flows through pipe 24, ejector by-pass passage 67 and chamber 56 to the service outlet 66. During service, the pressure at the regenerant inlet chamber 45 of the ejector is maintained at a relatively high value substantially the same as the pressure in the chamber 56, and this pressure is applied through pipe 98 to the diaphragm valve 89 to block flow therethrough into the regenerant compartment 14. In addition, the pressure at the regenerant inlet chamber of the ejector is applied to the diaphragm valve 91 through pipes 81 and 101, so as to block flow into the regenerant compartment through pipe 81.

During backwash, the drain valve 73 is opened and the flow reversing valve 61 is in its raised position shown in FIG. 3. Fluid from the flow reversing valve is now passed through the ejector and reduces the pressure at the inlet chamber 45 thereof sufficient to open the diaphragm valves 89 and 91. Liquid is then introduced into the regenerant chambers through pipe 88 at a rate slightly greater than the rate at which it is drawn through pipe 81. The liquid level thus builds up in the regenerant chamber to completely immerse and dissolve all of the salt therein and to rinse the valves and other mechanism in the regenerant chamber to prevent the buildup of corrosive deposit thereon. The ejector passes the regenerant to the bottom of the treatment tank through pipe 24 and the effluent from the top of the treatment tank flows through the upper distributor, pipe 59 and valve 42 to drain. When all of the salt has been dissolved in the regenerant tank, the continued flow of water from the reversing valve to the ejector serves to rinse the bed of exchange material in the treatment tank.

The differential rate between the rate of inflow through pipe 88 and outflow through pipe 81 is advantageously so arranged that the liquid level does not build up the level 110 until after all of the salt has been dissolved in the regenerant compartment. The syphon overflow is then operative to draw off the liquid from the regenerant compartment until the liquid level reaches the lower end 108 thereof. This provides a head space for the regenerant compartment to permit introduction of a subsequent charge of salt thereinto, at the beginning of the succeeding regeneration operation.

At the completion of the regeneration cycle, the drain valve 73 is closed and the valve member 61 drops to its lower service position shown in FIG. 2 and the treatment apparatus is ready for another service run.

I claim:

1. In a water treatment apparatus, the combination of an upstanding tank, a partition removably attached to the tank intermediate its ends separating the tank into an upper regenerant compartment and a lower treatment compartment, first and second conduits attached to said partition for removal therewith and extending into said treatment compartment to communicate therewith adjacent opposite ends thereof, an ejector supported on said partition for removal therewith and having a raw water inlet, an outlet communicating with said first conduit, and a suction chamber intermediate said inlet and outlet, means including a regenerant supply conduit communicating said suction chamber with said regeneration chamber adjacent said partition, a flow reversing valve disposed in said regenerant compartment and connected to said second conduit and to said ejector, said flow reversing valve having an inlet and a valve member movable from a first position in which water is directed from the inlet to said second conduit to a second position in which raw water from the inlet is directed to the inlet of the ejector, and means disposed externally of said tank for operating said flow reversing valve.

2. In a water treatment apparatus, the combination of a treatment compartment and a regenerant compartment, first and second conduits communicating with the treatment compartment adjacent opposite ends thereof, an ejector having a raw water inlet, an outlet communicating with said first conduit, and a suction chamber intermediate said inlet and outlet, regenerant supply conduit means communicating said suction chamber with said regenerant compartment adjacent the bottom thereof, valve means connected to said second conduit and to the inlet of the ejector operative in one position thereof to pass water to said second conduit to the treatment compartment and in the other position thereof to pass water to the inlet of said ejector for flow therethrough whereby to draw regenerant from the regenerant compartment and pass the same through the first conduit to the treatment compartment, means including a raw water feed line operative when said valve means is in said other position for feeding water to the regenerant compartment at a rate in excess of the rate at which regenerant is drawn therefrom by the ejector whereby the liquid level in the regenerant compartment gradually rises, and a syphon overflow tube having the inlet thereof disposed above the bottom of the regenerant compartment, said syphon tube extending upwardly from the inlet to an upper level above the inlet and below the top of the regenerant compartment and then downwardly externally of the regenerant compartment to a level below the inlet whereby the liquid level in the regenerant compartment first rises to said upper level and the syphon tube then drains the excess liquid from the regenerant compartment down to the level of the inlet of the tube to provide head space for a subsequent batch of regenerant material.

3. The combination of claim 2 including a feed line valve in said feed line having a fluid pressure responsive operator, and conduit means communicating said pressure responsive operator to said suction chamber whereby to apply fluid pressure to the operator to close said feed line valve when said valve means is in said one position and to reduce the pressure on said operator when said valve means is in said second position to thereby open said feed line valve.

4. The combination of claim 3 including a regenerant control valve in said regenerant supply conduit means operative to open to permit flow to the ejector and to close to prevent flow therethrough from the ejector to the regenerant compartment.

5. In a water treatment apparatus, the combination of an upstanding tank, partition means separating the tank into a lower treatment compartment and an upper regenerant compartment, first and second conduits extending through said partition means and communicating with the treatment compartment adjacent opposite ends thereof, a distributor in the regenerant compartment adjacent said partition, an ejector in the regenerant compartment having a raw water inlet, an outlet communicating with said first conduit, and a suction chamber intermediate said inlet and outlet, regenerant supply conduit means communicating said suction chamber with said distributor, valve means in the regenerant compartment connected to said second conduit and to the inlet of said ejector operative in one position to pass water through the second conduit to the treatment compartment and in the other position to pass water to the inlet of the ejector for flow therethrough whereby to draw regenerant from the regenerant compartment and pass the same through said first conduit to the treatment compartment, means for feeding water to the regenerant compartment at a rate in excess of the rate at which regenerant is drawn therefrom by the ejector, and a syphon overflow tube having the inlet thereof communicating with the regenerant compartment a preselected distance above the partition means, said tube extending from the inlet upwardly to an upper level above the inlet and below the upper edge of the regenerant compartment and then downwardly externally of the regenerant compartment to a level below its inlet whereby the liquid level in the regenerant compartment first raises to said upper level and then decreases to the level of the inlet of said syphon.

6. The combination of claim 5 including a feed line valve in said feed line and located within said regenerant compartment, fluid pressure responsive means for operating said feed line valve, and conduit means communicating said operator with said suction chamber to close said feed line valve when said valve means is in said one position supplying water to the treatment compartment through said second conduit and to open said feed line valve when said valve means is in said other position supplying water to the inlet of the ejector.

7. The combination of claim 6 including a regenerant control valve in said regenerant supply conduit means operative to open to permit flow to the ejector and to close to prevent flow therethrough from the ejector to the regenerant compartment, said control valve being disposed within said regenerant compartment.

8. In a water treatment apparatus, means defining a treatment compartment and a regenerant compartment, said regenerant compartment having an open top, valve means operative during regeneration for passing liquid from the regenerant compartment to the treatment compartment at a controlled rate, means operative during regeneration for passing liquid into the regenerant compartment at a rate in excess of the rate at which it is withdrawn therefrom whereby the liquid level in the regenerant compartment gradually builds during regeneration, and a syphon type overflow tube having the inlet thereof communicating with said regenerant compartment at a preselected lower level therein, said tube extending upwardly from the inlet to a preselected upper level above the inlet and below the top of the regenerant compartment to a level below the inlet whereby the siphon overflow tube is operative when the liquid in the regenerant compartment reaches said preselected upper level to pass liquid from the regenerant compartment to drain until the liquid level in the regenerant compartment falls to a preselected lower level below said inlet whereby to provide head space for the introduction of a subsequent charge of regenerant material into the regenerant compartment.

9. The combination of claim 8 wherein said valve means is disposed within said regenerant compartment.

References Cited in the file of this patent

UNITED STATES PATENTS

| | | |
|---|---|---|
| 1,725,110 | Stickney | Aug. 20, 1929 |
| 1,949,044 | Dotterweich | Feb. 27, 1934 |
| 2,680,714 | Carlsson | June 8, 1954 |
| 2,832,373 | Scholer | Apr. 29, 1958 |
| 2,855,944 | Albin | Oct. 14, 1958 |